(12) United States Patent
Meyer et al.

(10) Patent No.: US 10,680,907 B1
(45) Date of Patent: Jun. 9, 2020

(54) DEVICES AND METHODS FOR USE IN MANAGING ACCESS TO COMPUTER SYSTEMS

(71) Applicant: MASTERCARD INTERNATIONAL INCORPORATED, Purchase, NY (US)

(72) Inventors: Mark Richard Meyer, Lake Saint Louis, MO (US); Srinivas Kosaraju, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/374,258

(22) Filed: Apr. 3, 2019

(51) Int. Cl.
*G06F 15/173* (2006.01)
*H04L 12/24* (2006.01)
*H04L 29/08* (2006.01)

(52) U.S. Cl.
CPC .............. *H04L 41/50* (2013.01); *H04L 67/32* (2013.01)

(58) Field of Classification Search
CPC ........ H04L 41/50; H04L 67/32; H04L 67/306
See application file for complete search history.

(56) References Cited

U.S. PATENT DOCUMENTS

| 6,038,664 | A * | 3/2000 | Schumacher | ....... H04L 12/5692 709/217 |
| 6,161,139 | A * | 12/2000 | Win | ...................... G06F 21/604 709/223 |
| 8,819,068 | B1 * | 8/2014 | Knote | .................. G06F 16/2282 707/790 |
| 2011/0162046 | A1 * | 6/2011 | Forster | .................... G06F 21/41 726/4 |
| 2013/0067594 | A1 * | 3/2013 | Kantor | ................... G06Q 50/01 726/28 |
| 2016/0048816 | A1 * | 2/2016 | Friedman | ........... G06Q 20/1085 705/43 |
| 2017/0098218 | A1 * | 4/2017 | Rios | .................... G06Q 20/4014 |

* cited by examiner

*Primary Examiner* — Jonathan A Bui
(74) *Attorney, Agent, or Firm* — Harness, Dickey & Pierce, P.L.C.

(57) ABSTRACT

Systems and methods are provided for managing requests for access to one or more systems. One exemplary method includes receiving, through a request interface, a keyword associated with multiple roles and identifying one or more of the multiple roles consistent with the keyword, causing the identified role(s) to be displayed to the user at the communication device in the request interface, and, upon selection of one or more of the identified role(s) by the user, applying at least one access rule to the selected one or more of the identified role(s). The method then also includes issuing a notification to the user, at the request interface, when the selected one or more of the identified role(s) violates the at least one rule, where the notification indicates the violation and the at least one access rule, thereby permitting the user to select one or more different roles from the identified role(s).

16 Claims, 4 Drawing Sheets

DEVICES AND METHODS FOR USE IN MANAGING ACCESS TO COMPUTER SYSTEMS

FIELD

The present disclosure is generally directed to devices and methods for use in managing access within one or more computer systems, and in particular, to devices and methods for use in handling requests, from users, for access to specific networks, platforms, applications, data, etc., included within the one or more computer systems.

BACKGROUND

This section provides background information related to the present disclosure which is not necessarily prior art.

Different entities are known to be associated with computer systems that are employed to further one or more objectives of the entities (e.g., business objectives, etc.). For example, a company may employ a computer system, which permits employees of the company and others to access the computer system to produce, control and/or deliver products offered to customers. Regardless of the types of the computer systems and entities involved, parts of the computer systems are accessed by users (e.g., employees, etc.) to carry out the objectives of the given entities. In connection therewith, certain ones of the users may access some applications or data included within the computer systems, while other users may access the same or different applications or data included within the computer systems or may be restricted therefrom. In general, the users are granted access for applications and/or data based on the responsibilities of the users and/or relationships of the users to the entities. Further, such access of the users is known to be managed by access management platforms within the computer systems, whereby the users are assigned rights and permissions to not only access applications and/or data, but to also define the users' permissions within the accessed applications and/or data (e.g., permissions to change, read only, etc.). To apply for the access, the users are known to interact with one or more persons associated with the access management platforms, whereby requests for access are approved by the proper persons and then, if appropriate, granted consistent with the approval and/or applicable rules related thereto.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
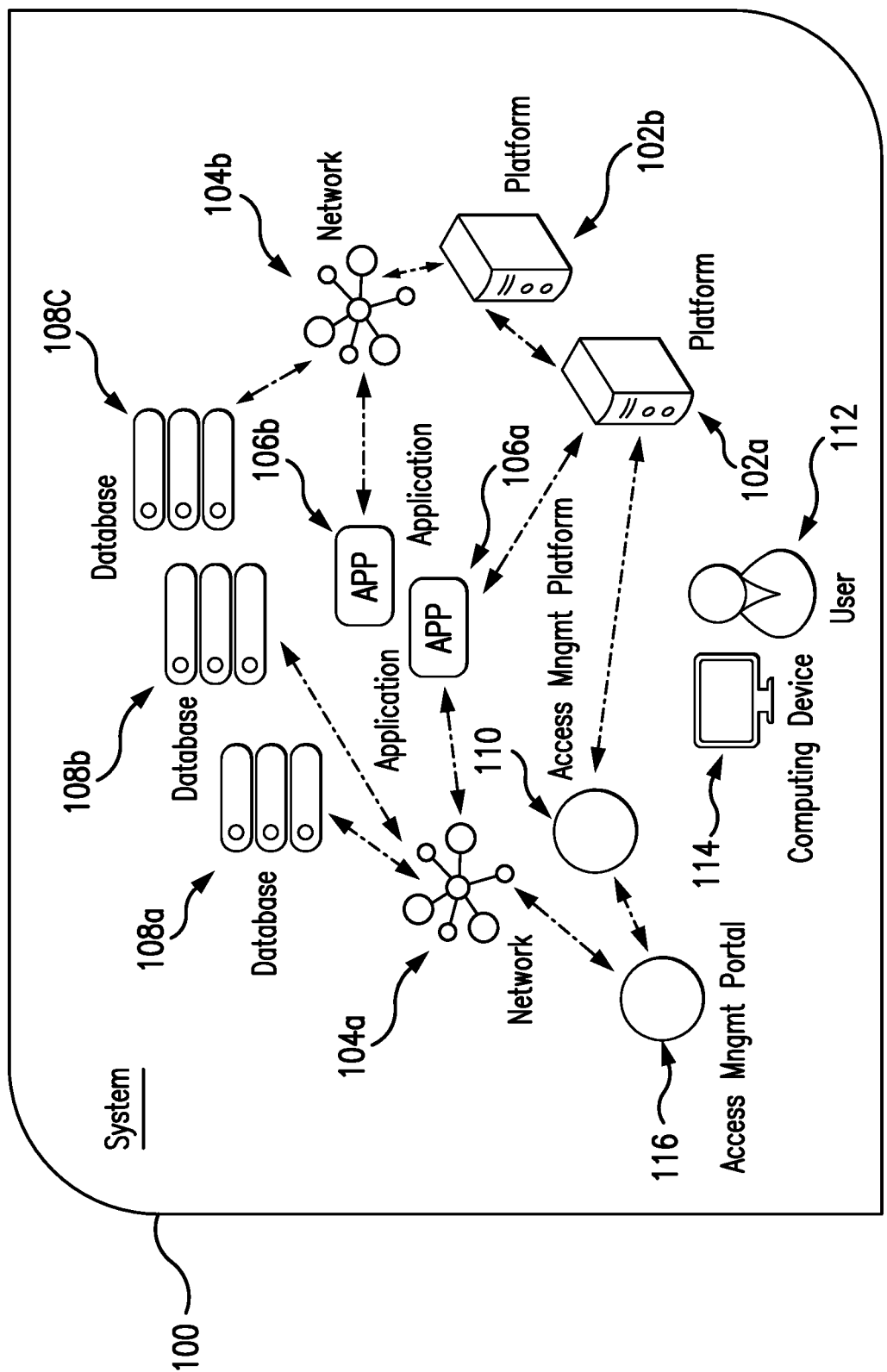
FIG. 1 is an exemplary system of the present disclosure suitable for use in initiating access for users to a computer system, based on one or more roles of the users within an entity associated with the computer system.

Exemplary embodiments will now be described more fully with reference to the accompanying drawings. The description and specific examples included herein are intended for purposes of illustration only and are not intended to limit the scope of the present disclosure.

Users are often provided with access to systems (e.g., computer systems, etc.) by administrators of the systems. The access may be unlimited, or it may be limited based on credentials and/or roles of the users in the systems. For example, when a user requests access to a system, the request may be submitted to an administrator of the system, or other person, who then queues the request for approval and grants access to the system when the request is approved. It may be common for the administrator or other person, or the user, as part of the request, to request access based on duplication of the access granted and/or roles of a similarly situated user (e.g., a current employee has three roles within a company (and access to a computer system associated with the company corresponding to his/her three roles), so for a new employee of the company having the same three roles, the access request would be consistent with the access already approved for the current employee; etc.). This manner of selecting roles and determining access based on such roles is inefficient, though, as it may lead to improper and/or insufficient access for the user, undue delay in approving access when the user asks for incorrect access, and, potentially, removal of access and/or duplication of access requests to find the right access for the user. In addition, the approval process may fail to recognize violations of rules because sequential requests for access may not abide by rules of access considering all the requests, whereby the user may be granted access to multiple aspects of the system, which are not permitted by the rules and which are continued until an audit of accesses to the system is performed.

With that said, the devices and methods herein uniquely provide an access management portal, whereby users are engaged in an interface to submit requests for access to a computer system, and where the interface applies rules to the requested access of the user and to prior access of the user. In particular, when a user desires or needs access to aspects of the computer system (e.g., to platforms, networks, applications, data, or combination thereof, etc.), the user accesses the access management portal, and searches for the different roles consistent with the user's desired or needed access (e.g., by keyword searching, etc.). As the roles are presented, they are associated with corresponding definitions, descriptions of the corresponding access, and rules associated with the access. The interface may further apply the access rules for the roles selected or presented, against one another and the previously assigned roles for the user. The user is then able to select the roles appropriate for the user, and to create the request for access. The access management portal then submits the request, and thereafter, monitors progress of the request. In this manner, the access request by the user (and other access requests by other users) is/are standardized to the interface, which imposes rules on the access for the user(s), whereby requests inconsistent with the rules are not submitted and thereby do not inhibit or restrict access in violation of the access rules.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, types of systems and aspects thereof associated with particular businesses, companies or entities; different roles and access and/or rules associated with the roles of the particular businesses, companies or entities; privacy requirements; etc.

In general, the system 100 of the present disclosure generally includes a computer system or computer-based system or network, and is associated with an entity such as, for example, a company, a business, a group, an institution (e.g., a college, university, etc.), etc. In this exemplary embodiment, the system 100 is described as associated with a payment network. In connection therewith, the illustrated system 100 is configured to provide one or more services to users associated with the payment network to further one or more objectives of the payment network. For example, the system 100 may be configured to provide transaction services (e.g., to facilitate authorization of transactions, etc.), virtual wallet services, clearing and settlement services (e.g., for receiving batch files and issuing advisement messages, etc.), etc. It should be appreciated that the types and/or number of services provided by/from the system 100 is based, in general, on the type of entity and the objective(s) of the entity (be it the payment network or other entity).

As shown in FIG. 1, the illustrated system 100 particularly includes platforms 102*a-b*, networks 104*a-b*, applications 106*a-b*, and databases 108*a-c* (broadly, multiple different aspects). With that said, the particular aspects to be included in the system 100 often depend on, for example, the one or more services to be offered by the entity associated with the system 100 and/or the manner in which those one or more services are to be offered, etc. In this exemplary embodiment, in which the system 100 is described as associated with a payment network, the platforms 102*a-b* include different computer platforms that may be accessed by users associated with the payment network, where the users include employees (e.g., people employed with or otherwise associated with the payment network for pay or compensation (e.g., directors, contractors, etc.), etc.) and customers (e.g., payment account holders, banking institutions, merchants, etc.). The different networks 104*a-b* of the system 100 may be separated by a geographic distance, or segregated based on security associated with the contents of the networks (e.g., based on platforms, networks, applications, databases, etc. associated therewith) and may each include, without limitation, a local area network (LAN), a wide area network (WAN) (e.g., the Internet, etc.), a mobile network, a virtual network, and/or another suitable public and/or private network capable of supporting communication among two or more computing devices included in the system 100, or any combination thereof.

In addition in this exemplary embodiment (where the system 100 is described as associated with a payment network), the applications 106*a-b* of the system 100 may include applications related to transaction clearing (e.g., applications such as NTZ_Clearing_Read Only, NTZ_Clearing_Encrypted, and/or NTZ_Clearing_Anonymized, etc., where data associated with the payment network is stored on a Netezza platform; etc.) and/or reporting-based applications (e.g., an Oracle Enterprise reporting application such as ORA_ER_Reporting_Clearing and/or ORA_ER_Auth, ORA_ER_Debit, etc.; etc.). It should be appreciated, though, that the applications 106*a-b* may be (or may include) other applications in the system 100, where access is granted to users based on one or more criteria. And, the databases 108*a-c* include data which is created, compiled, and/or generated in the payment network and then stored by the payment network, and also data which is created, compiled or generated outside of the payment network and then provided to the payment network to be stored therein. As such, the data in the databases 108*a-c* may be owned by a third party outside of the payment network, and thus, in view of the above, various restrictions about what data users may view and/or access, along with restrictions on the use of the particular data (which may be different per data) will generally be imposed on the databases 108*a-c* and other databases in the system 100 or on databases in other system embodiments. As an example, the databases 108*a-c* may include, respectively, public transaction data, encrypted transaction data, and anonymized transaction data, where the transaction data is clearing data (although this is not required in all implementations of the system 100). In general, data may be segregated within the databases 108*a-c*, with some data being more sensitive and other data being less sensitive. Access to the data in the databases 108*a-c*, then, may depend, at least in part, on the sensitivity of the data. What's more, the databases 108*a-c* may also each include multiple data structures, each having different subsets and/or parts of the data included in the database.

It should again be appreciated that the above aspects of the system 100 may be otherwise in other embodiments, and may include other data and/or offer other services, etc. within the scope of the present disclosure (e.g., depending on the particular entity with which the system 100 is associated, etc.). In particular, it should be appreciated that the system 100 (and the features described herein and related thereto) may be associated with entities other than payment networks in other embodiments (i.e., the present disclosure should not be understood as limited to payment networks even though it is applicable thereto).

The system 100 is also governed by multiple rules associated with the different aspects of the system 100 (e.g., associated with the platforms 102*a-b*, the networks 104*a-b*, the applications 106*a-b*, and the databases 108*a-c*, etc.), which define the aspects and the limitations on access to the aspects. In connection therewith, the system 100 includes an access management platform 110 that defines numerous roles within the entity with which the system 100 is associated (for example, the payment network in the current description) and assigns access to the aspects for each of the roles. In addition, the access management platform 110 also imposes rules for the roles, whereby different aspects of the system 100, which are to be maintained as separate, for example, are segregated in the access granted to users (based on the rules). For example, database 108*a* may include public clearing data, which includes complete clearing data (e.g., primary account numbers (PANs), payment account holder names, etc.). Conversely, the database 108*c* may include anonymized clearing data, which eliminates or filters out identifying data for payment account holders (e.g., the PANs, the payment account holder names, etc.). The access management platform 110 may be configured, therefore, to impose a rule that prevents access to a user to both the public clearing data and the anonymized clearing data, as the user could correlate the two and defeat the purpose of the anonymization. As another example, a user may have access to encrypted authorization data, whereby the access management platform 110 may be configured to impose a rule that allows the user access to data on multiple databases (that reside on multiple platforms), as long as the access is consistent to the encrypted authorization data (e.g., under the rule, the user may have access to the encrypted authorization data across multiple platforms like Oracle, Netezza, Hadoop; etc.). It should be appreciated that other rules may be employed to limit access to certain aspects of the system 100 based on access to other aspects, based on tasks/roles assigned to the users, and/or based on ratings of the users, etc. Table 1 includes a list of exemplary rules that may be imposed by the access management platform 110 in the system 100.

TABLE 1

| Rule Designation | Rule Description |
| --- | --- |
| Rule #1 | Access to only one of database 108a and database 108c |
| Rule #2 | Access to database 108c will provide access to anonymized dates of clearing included therein |
| Rule #3 | Access to platform 102b; and, if you are a member of a particular group of the system 100 (e.g., a member of the fraud team of the payment network, etc.), you will have access to encrypted data in database 108a |
| Rule #4 | For application 106b, if you have access to database 108c, you will only get access to certain reports |
| Rule #5 | Access to encrypted clearing zones of database 108a is provided only if you have access to clearing encrypted data |
| Rule #6 | Access to platforms 102a and 102b and databases 108a, 108b, and 108c for all authorization encrypted data |

In general, the rules may be imposed by the access management platform 110 of the system 100 regardless of the user requesting access, or the rules may be dependent on the user 112 (e.g., the rules may be applied to the user 112 and/or an identification of the user 112, etc.), or a role of the user within the payment network. That said, apart from the rules, the access management platform 110 further defines several roles within the system 100, where each role defines access to one or more aspects of the system 100. Each of the roles is generally associated with a definition and/or a description of the access associated with the role. The roles may define specific access permissions for each of the access, for example, where one level of a user may have read only access to a given data structure, while a different level of a user may have access that includes read-write access for the data structure. With that said, Table 2 includes multiple exemplary roles that may be defined by the access management platform 110, and corresponding definitions and descriptions associated therewith. In connection therewith, the exemplary roles may include, without limitation, administrator roles, clearing administrator roles, public user roles, clearing user roles—level 1, clearing user roles—level 2, etc.

TABLE 2

| Role | Definition | Description |
| --- | --- | --- |
| Administrator | Systems Access | Root access to system to support patching and upgrades |
| Clearing Administrator | Data Administrator | Access to make updates to add columns and tables |
| Public User | Data Administrator | Only access to public objects |
| Clearing User - Level 1 | Encrypted user - Clr_detail_Enc | Access to only encrypted data sets |
| Clearing User - Level 2 | Hash User - Clr_detail_hsh | Access to only anonymized data sets |

It should be appreciated that various other roles may be defined in the system 100, by the access management platform 110, and which define the access for users assigned to and/or associated with the particular roles. It should also be appreciated that the roles defined by the access management platform 110 may be different depending on the type of entity with which the system 100 is associated, the type and number of aspects of the system 100, etc.

Further in the system 100, the different aspects (e.g., associated with the platforms 102a-b, the networks 104a-b, the applications 106a-b, and the databases 108a-c, etc.) may interact with one another, for example, by being in communication with one another, by being coupled to one another, and/or by being included (in whole or in part) in one another. As an example, the application 106a may be included in and hosted by the platform 102a. In connection therewith, exemplary interactions among the multiple aspects of the system 100 are indicated in FIG. 1 by the dotted, arrowed lines. It should be appreciated that additional interactions and/or different interactions may exist in the system 100 in other embodiments, as would be apparent to those skilled in the art from the present disclosure.

With continued reference to FIG. 1, a user 112 is associated with the system 100, where the user 112 may include an employee of the payment network or a user associated with the payment network (e.g., through one or more relationships with the payment network (e.g., as a customer, as a contractor, etc.), etc.). In this exemplary embodiment, the user 112 is a new employee of the payment network, who is assigned to a job with a responsibility that requires access to platform 102b, network 104a, applications 106a-b, and databases 108a-b. The user 112 is further associated with a computing device 114, which may include, for example, a smartphone, a laptop computing device, a workstation, etc.

The system 100 further includes an access management portal 116. The access management portal 116 may include a standalone computing device in the system 100 (e.g., a workstation, a server, etc.), as indicated in FIG. 1, or the access management portal 116 may be integrated in whole, or in part, in one or more of the aspects of the system 100. Regardless of implementation, the access management portal 116 is configured, by executable instructions, to operate as described herein.

For example, the access management portal 116 is configured to be accessible to the user 112 through the computing device 114 (or one or more other computing devices at which the user 112 is located) and/or accessible to another user associated with the user 112. Then, in response to a particular input or other selection by the user 112 for access, at the computing device 114, the access management portal 116 is configured to display a request interface to the user 112. The request interface includes fields to enter the name of the user 112 (for whom access is being requested), details about the user 112 (e.g., a job title, etc.), and/or identifying information associated with the user 112 (e.g., an employee identity number, etc.). The request interface also includes a search field (or multiple search fields), in this exemplary embodiment, which solicits one or more search terms to be used to identify one or more roles related to the user 112. This will be described in more detail in connection with the method 300. In response to the search term(s) (and, potentially, a search input) from the user 112, the access management portal 116 is configured to search for roles consistent with the search term(s) and to present search results (consistent with the search and/or keywords) to the user 112 in the request interface. The search results, in this example, will be listed by role, along with a definition of the role and a description of the access associated with the role (e.g., as in Table 2, etc.). The definitions and descriptions may include, for example, the definitions and descriptions included in Table 2 or a variant thereof.

The access management portal 116 may also be configured to visually distinguish the search results based on application of access rules imposed by the access management platform 110. For example, identified roles that conflict with the user's current roles, if any, may be listed in RED or greyed out and/or un-selectable, while other roles are selectable.

Next in the system 100, in response to identification of the roles by the access management portal 116, the user 112 may select one or more roles for which to request access, by selecting, marking, checking or otherwise designating the role(s) from the search results. In turn, the access management portal 116 is configured to check the associated rules (e.g., the rules in Table 1, etc.) for any violations, to generate a request if there is no violation(s) (which is formatted consistent with the access management platform 110), and to transmit the request to the access management platform 110. The request may include, without limitation, a designation of the user 112 and also a designation of the roles selected by the user 112, by which access is to be granted to the system 100 for the user 112. Alternatively, when a violation of a rule is noted, the access management portal 116 is configured to display the request interface with an error message as to the source of the violation (potentially, with explanation), or otherwise inform the user 112 of the violation. The user 112 may then have the option to modify the selected roles and to re-request the access, whereupon the access management portal 116 is configured to check the associated rules again for any violations, to generate a request (if there are no violations), and to transmit the request to the access management platform 110. The access management platform 110 is configured to then process the request, for example, by seeking approval for such access from one or more persons, etc. And, when the access request is processed, the access management platform 110 may provide a notice and/or access credentials to the user 112, directly or via the access management portal 116.

Moreover in the system 100, the access management portal 116 is configured to submit a query for status from the access management platform 110 with regard to the access request, at one or more regular or irregular intervals (e.g., hourly, daily, weekly, etc.), or in response to an inquiry from the user 112. The access management portal 116 may then be configured to generate and transmit reports (e.g., audit reports, etc.) associated with the access of the user 112 and/or other users (e.g., all users, users for a specific role, users of certain types, etc.), etc., or respond to the user's inquiry for status. As an example, the access management portal 116 may be configured to generate a user list (e.g., for a management user of the payment network, etc.) of users that have conflicting access between hashed and encrypted data sets, etc.

Figure 2:
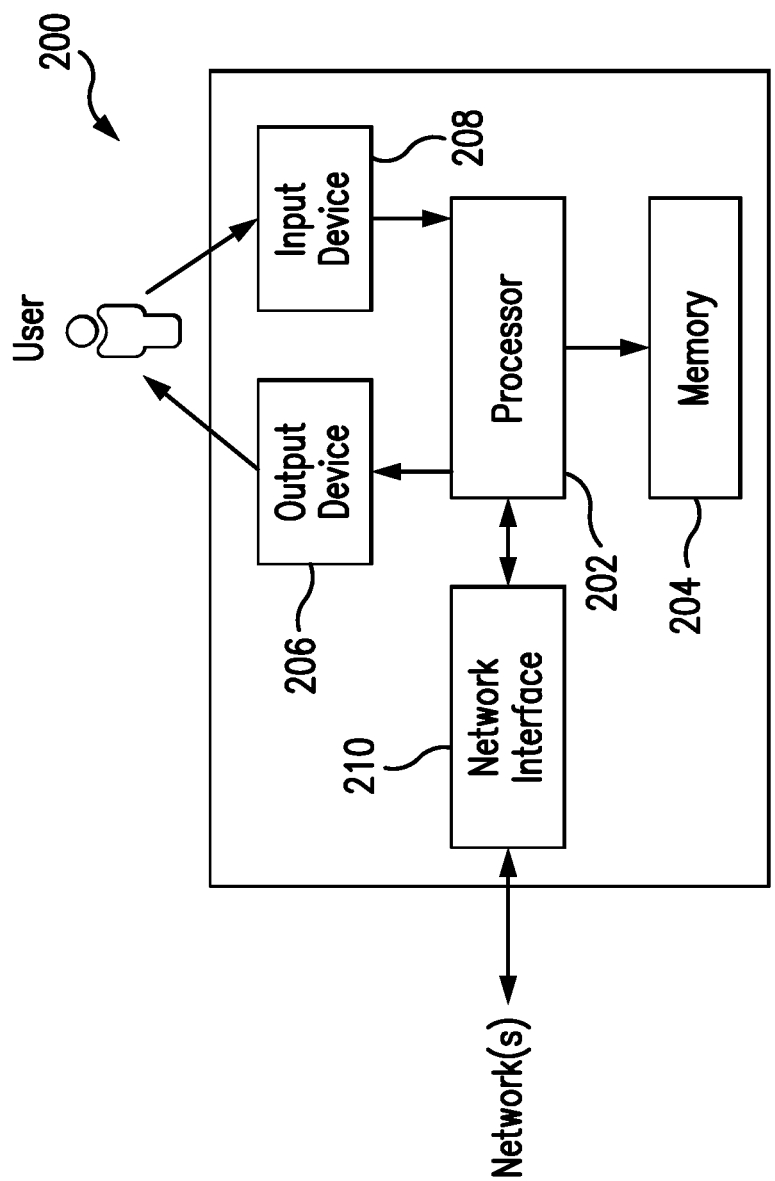
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the platforms 102a-b, the networks 104a-b, the databases 108a-c, the access management platform 110, the computing device 114, and the access management portal 116 is embodied as and/or provided in one or more computing devices that are generally consistent with the computing device 200. That said, the system 100 and the aspects and other parts thereof should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, request interfaces, rules, roles, definitions, descriptions, and/or any type of data (and/or data structures) suitable for use as described herein (e.g., as dependent on the type of entity associated with the system 100, etc.). Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components as specifically configured by the instructions to perform one or more of the various particular and unique operations herein. It should be appreciated that the memory 204 may include a variety of different memories, each implemented in one or more of the functions or processes described herein.

In the exemplary embodiment, the computing device 200 also includes an output device 206 that is coupled to (and is in communication with) the processor 202 (however, it should be appreciated that the computing device 200 could include one or more additional or other output devices other than the output device 206, etc.). The output device 206 outputs information (e.g., roles, definitions and descriptions of roles, restrictions on roles, etc.), visually or audibly, for example, to a user of the computing device 200, etc. And, various interfaces may be displayed at computing device 200, and in particular at the output device 206, to display certain information in connection therewith. The output device 206 may include, without limitation, a presentation unit such as a liquid crystal display (LCD), a light-emitting diode (LED) display, an organic LED (OLED) display, an "electronic ink" display, etc.; or another output device such as a speaker, another computer, etc.; etc. In some embodiments, the output device 206 may include multiple devices.

In addition, the computing device 200 includes an input device 208 that receives inputs from the user (i.e., user inputs) of the computing device 200 such as, for example, selections of roles, etc. The input device 208 may include a single input device or multiple input devices. The input device 208 is coupled to (and is in communication with) the processor 202 and may include, for example, one or more of a keyboard, a pointing device, a touch sensitive panel (e.g., a touch pad or a touch screen, etc.), another computing device, and/or an audio input device. In various exemplary embodiments, a touch screen, such as that included in a tablet, a smartphone, or similar device, may behave as both the output device 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different ones of the networks herein, including networks 104*a-b*, and/or with other devices described herein. In some exemplary embodiments, the computing device 200 may include the processor 202 and one or more network interfaces incorporated into or with the processor 202.

Figure 3:
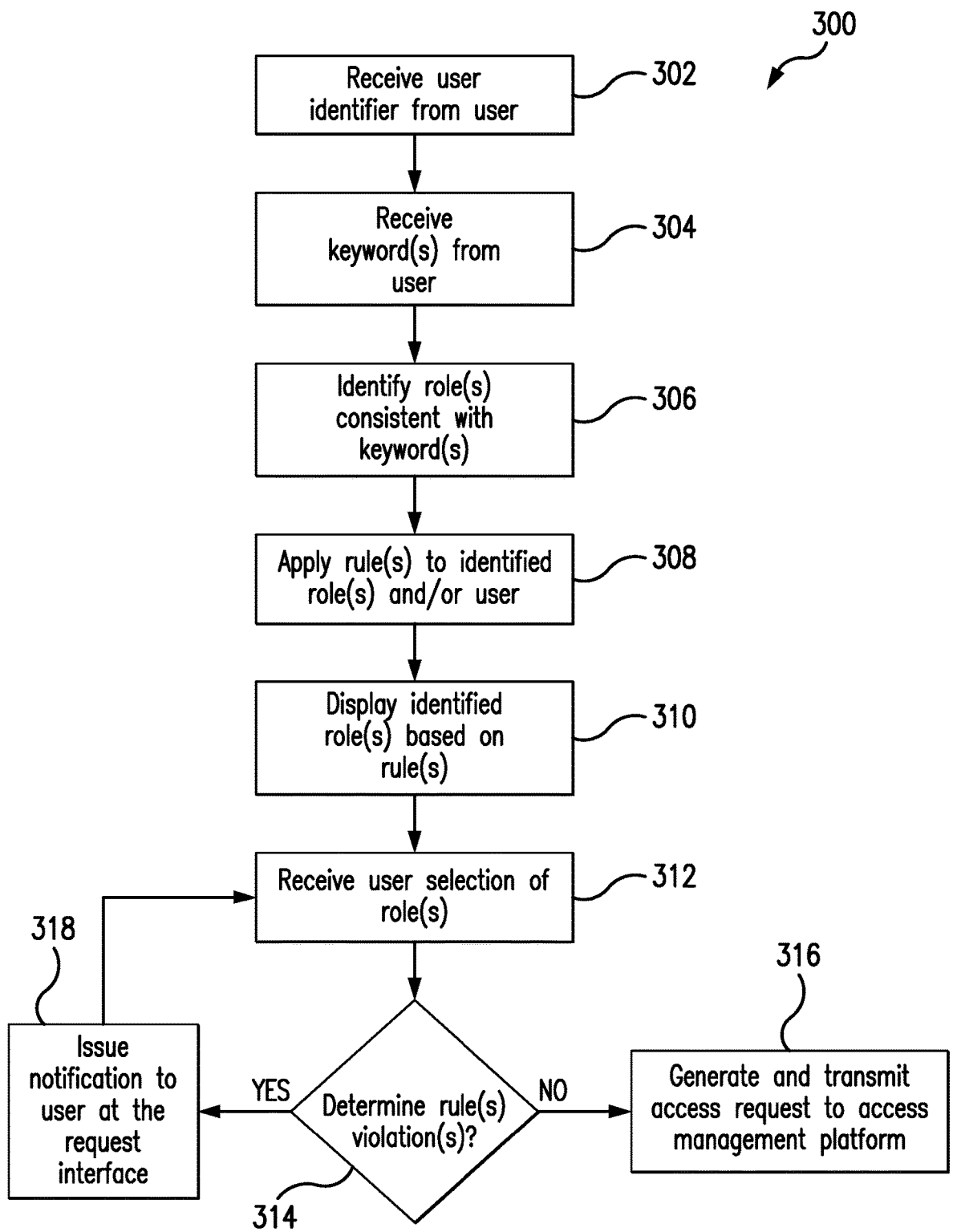
FIG. 3 is an exemplary method, which may be implemented in connection with the system of FIG. 1, for initiating access for a user, to a system, based on a role of the user within the system.

FIG. 3 illustrates an exemplary method 300 for use in managing requests for access to a system. The exemplary method 300 is described as implemented in the access management portal 116 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

As indicated above in the system 100, the method 300 is described with reference to the user 112 being a new employee of the payment network associated with the system 100. And, the new job for the user 112 is in the clearing division of the payment network, and on the first day, the user 112 simply has sufficient access to logon to the computing device 114 provided by the payment network. As such, method 300 may be implemented to manage a request by the user 112 to further access the system 100.

Figure 4:
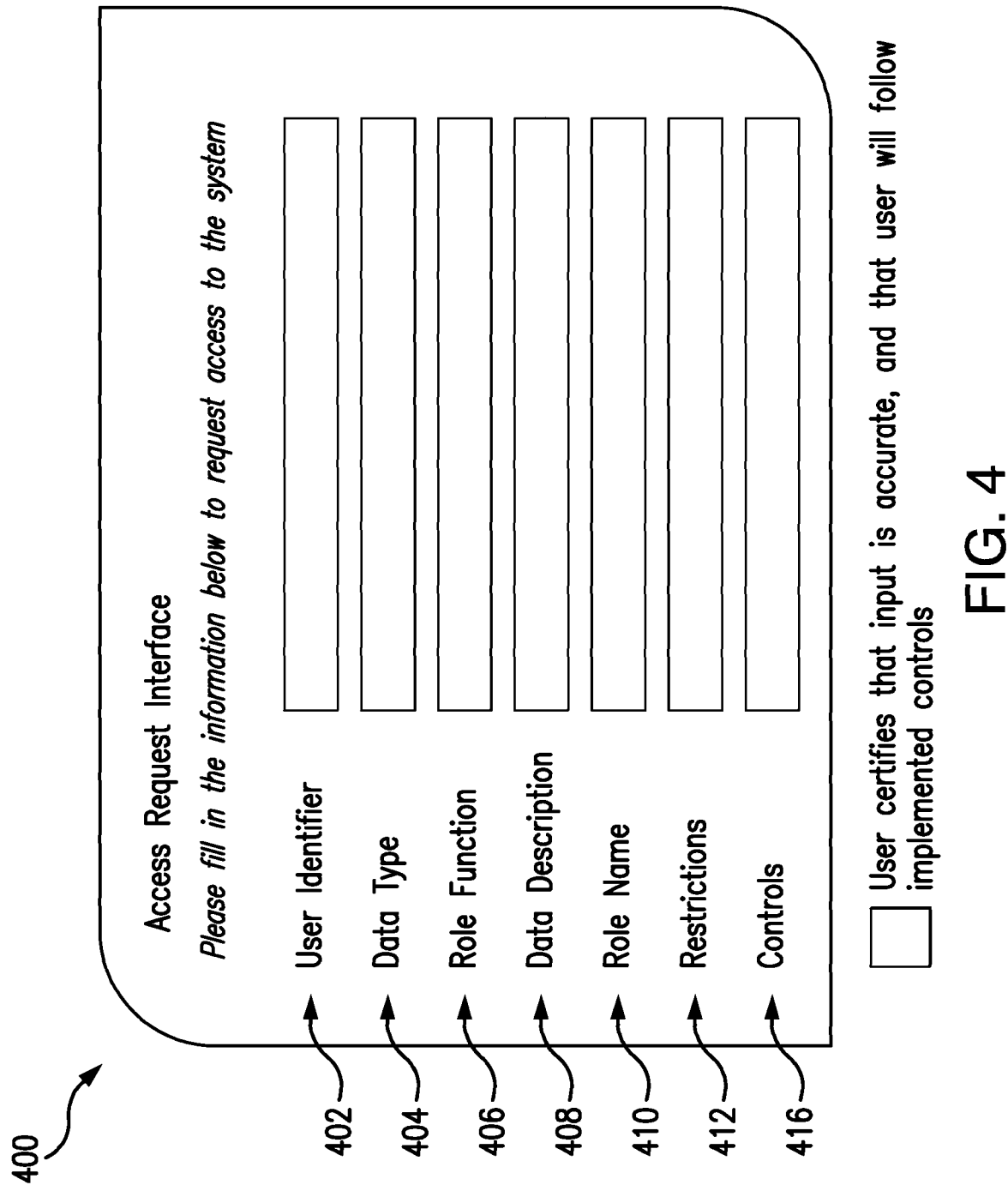
FIG. 4 is an exemplary request interface that may be used in the system of FIG. 1 and/or the method of FIG. 3 in connection with initiating access for a user to a system.

Upon accessing the computing device 114 (e.g., upon logging onto the computing device 114 for the first time or subsequently thereafter, etc.), the user 112 navigates to the access request interface provided by the access management portal 116 (e.g., through an Intranet link, etc.). In connection therewith, FIG. 4 illustrates an exemplary access request interface 400 that may be displayed to the user 112 at the computing device 114. As shown in FIG. 4, the exemplary access request interface 400 includes several fields in which keywords may be entered by the user 112 as part of a search to identify applicable roles. In connection therewith, for each of the fields (or for one or more particular ones of the fields), the interface 400 may provide drop down options from which the user 112 may select in answering the given questions (e.g., the user 112 may be required to enter his/her user identifier, and the interface 400 may then populate drop down selections for the other fields based on the particular user 112, etc.). In particular in this example, the illustrated interface 400 includes a user identifier field 402, a data type field 404, a role function field 406, a data description field 408, a role name field 410, a restrictions field 412, and a controls field 416. Example search terms (and/or drop down options) that may be entered/selected by the user 112 for each of the fields include: at the user identifier field 402—a name of the user 112, an employee ID number for the user 112, an email address for the user 112, etc.; at the data type field 404—authorization data, clearing data, debit data, etc.; at the role function field 406—encrypted user, anonymized user, etc.; at the data description field 408—core data, reporting, commercial data, etc.; at the role name field 410—authorization-encrypted, clearing-encrypted, debit-anonymized, etc.; at the restrictions field 412—users with encryption roles can't have access to anonymized data, financial reports only granted to managers, etc.; and at the controls field 416—if running a one-time weekly report then access will be reminded in seven days; etc. It should be appreciated that the interface 400 may include more fields, fewer fields, or even other fields in other exemplary embodiments (e.g., depending on the particular system to which access is requested, etc.).

Referring again to FIG. 3, when the user 112 enters a user identifier (e.g., a name, an employee identification number, etc.) into the access request interface (e.g., into the user identifier field 402 of the access request interface 400 of FIG. 4, etc.), the access management portal 116 receives, at 302, the user identifier from the user 112 (through the request interface). In addition to the identifier, the user 112 is also prompted to provide (and does provide) one or more keywords (e.g., in one or more of the fields 404-412 and 416 of the access request interface 400, etc.), such as, for example, "clearing," etc., relating to the user's new job (as the user 112 has been hired into the clearing division). In general, the keywords may include any description relating to an aspect of the system 100. In response, the access management portal 116 similarly receives, at 304, the keyword(s) from the user 112 through the request interface. As will be described, this received information allows the access management portal 116 to identify the user 112 and determine available, appropriate, etc. access for the user 112.

Next in the method 300, the access management portal 116 identifies one or more roles consistent with the keyword(s) provided by the user 112, at 306. In connection therewith, and prior to returning the results to the user 112 (i.e., the identified role(s)), the access management portal 116 also applies the rules, at 308, imposed by the access management platform 110 to the identified role(s) and/or to the user 112 (e.g., the applicable rules presented in Table 1, etc.). The access management portal 116 then displays the search results, i.e., the identified roles, as subjected to the rules, to the user 112 through the request interface, at 310.

For example, upon receiving the user identifier for the user 112 and the keywords, the access management portal 116 may search (at 306) in the data structure associated with Table 2, and identify the clearing administrator role, the clearing user—level 1 role, and the clearing user level 2 role for the user 112. And, because the user 112 has not yet been granted access to date to any of the aspects of the system 100 (besides login access to the computing device 114), in general, no rules will be implicated (at 308) as there should be no conflict of rules. Then in this example, the access management portal 116 may display the identified roles in conjunction with the definition and description for each role shown in Table 2. It should be appreciated that additional information may be included for each of the roles, as needed and/or helpful to the user 112. That said, it should be appreciated that if the user 112 was previously granted access to the public clearing data in the database 108*a*, in response to a prior request for access, the access management portal 116 may identify the clearing user—level 2 role as not available because it provides access to the anonymized clearing data in database 108c (based on Rule #1 in Table 1), or vice-versa, that the clearing user—level 1 role is not available. Here, the rule would then indicate, to the access management portal 116, to apply a visual distinction to the role of "clearing user—level 2" or to the role of "clearing user—level 1" (e.g., present the role in a red color (when other text is black/grey), grey out the identified role (such that it is un-selectable), etc.). In this manner, then, the rules may be applied (at 308) based on the identity of the user 112 and the prior access associated with, or not associated with, the user 112.

Then in the method 300, the user 112 is able to browse the identified roles and select one or more roles suited to his/her new job and/or responsibilities. In response to the selection by the user 112, the access management portal 116 receives, at 312, the user's selection of the role(s). And, the access management portal 116 determines (or confirms), again, at 314, whether the selections violate any of the applicable rules to the corresponding role(s) (e.g., such as the rules included in Table 1, etc.) and/or any other additional/different rules. It should be appreciated that the rules applied at 314 may be the same as or different from the rules applied at 308. When the selected one or more of the identified roles does not violate any rules, the access management portal 116 generates an access request and transmits the access request to the access management platform 110, at 316. The access management platform 110, in turn, processes the access request according to procedures specific thereto for granting access to the system 100 (e.g., business as usual procedures, etc.).

Conversely, if the selected one or more of the identified roles does violate a rule (at 314), the access management portal 116 issues, at 318, a notification to the user 112, via the access request interface, indicating the violation. The notification may simply indicate that the selected role(s) are not available to the user 112, or the notification may indicate the particular rule(s) violated. When this occurs, the user 112 is then provided an opportunity to select one or more different roles from the identified roles in the request interface, whereby the access management portal 116 returns to 312 upon the user's selection and repeats the subsequent operations of method 300.

Again and as previously described, it should be appreciated that the functions described herein, in some embodiments, may be described in computer executable instructions stored on a computer readable media, and executable by at least one processor. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) displaying a request interface and/or causing the request interface to be displayed at a communication device associated with a user requesting access to a system; (b) receiving, through the request interface, a keyword associated with one or more of the multiple roles in the data structure, from the user; (c) identifying each role from the multiple roles consistent with the keyword; (d) displaying each identified role and/or causing each identified role to be displayed at the communication device in the request interface, thereby permitting the user to select from the identified role(s); (e) upon selection of one or more of the identified role(s), applying at least one access rule to the selected one or more of the identified role(s); (f) issuing a notification to the user, at the request interface, when the selected one or more of the identified role(s) violates the at least one rule, the notification indicating the violation and the at least one access rule, thereby permitting the user to select one or more different role from the identified role(s); (g) generating an access request for the user when the selected one or more of the identified role(s) does not violate the at least one rule; and (h) transmitting the access request to an access management platform, thereby permitting the access management platform to process approval of the access request.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An access management portal computing device for managing requests for access to one or more systems, the computing device comprising:
   a memory having a data structure including multiple roles of users, each of the multiple roles associated with a definition and a description of access to at least one aspect of a system; and
   a processor coupled to the memory and configured to:
      cause a request interface to be displayed at a communication device associated with a user requesting access to the system, the request interface including at least one fillable field;
      receive, through the at least one fillable field of the request interface, a keyword associated with one or more of the multiple roles in the data structure, from the user;
      identify each role from the multiple roles consistent with the keyword;
      cause each identified role to be displayed at the communication device in the request interface, thereby permitting the user to select from the identified role(s);
      upon selection of one or more of the identified role(s), apply at least one access rule to the selected one or more of the identified role(s); and
      issue a notification to the user, at the request interface, when the selected one or more of the identified role(s) violates the at least one access rule, the notification indicating the violation and the at least one access rule, thereby permitting the user to select one or more different role from the identified role(s).

2. The computing device of claim 1, wherein the at least one aspect of the system includes at least one of a platform, a network, an application and a database; and
   wherein each of the multiple roles defines access to at least one of the platform, the network, the application and the database.

3. The computing device of claim 1, wherein the processor is further configured to:
   generate an access request for the user when the selected one or more of the identified role(s) does not violate the at least one access rule; and
   transmit the access request to an access management platform, thereby permitting the access management platform to process approval of the access request.

4. The computing device of claim 1, wherein the processor is further configured to:
   apply at least one other rule to each identified role prior to causing the identified role to be displayed; and
   when the at least one other rule is restrictive of the identified role, cause the identified role to be displayed to the user at the communication device with a visual distinction applied to said identified role.

5. The computing device of claim 4, wherein the at least one aspect of the system includes multiple databases; and
   wherein the at least one access rule restricts access by the user to one of the multiple databases, when the user has access to another one of the multiple databases.

6. The computing device of claim 5, wherein the at least one other rule restricts a user from being assigned both a first role from the multiple roles and a second role from the multiple roles.

7. The computing device of claim 4, wherein the visual distinction applied to said identified role includes a color difference.

8. The computing device of claim 1, wherein the processor is further configured to receive an identification of the user from the user at the request interface; and
   wherein the processor is configured, in connection with applying the at least one access rule, to apply the at least one access rule to the selected one or more of the identified role(s) based on the user.

9. The computing device of claim 8, wherein the processor is further configured to apply at least one other rule to each identified role, based on the user, prior to causing the identified role to be displayed.

10. A computer-implemented method for managing requests for access to one or more systems, the method comprising:
   displaying a request interface and/or causing the request interface to be displayed at a communication device associated with a user requesting access to a system;
   receiving, by a computing device, from the user through the request interface, a keyword associated with one or more of multiple roles associated with the system;
   identifying, by the computing device, each role from the multiple roles consistent with the keyword;
   displaying each identified role and/or causing each identified role to be displayed at the communication device in the request interface, thereby permitting the user to select from the identified role(s);
   upon selection of one or more of the identified role(s), applying, by the computing device, at least one access rule to the selected one or more of the identified role(s);
   issuing, by the computing device, a notification to the user, at the request interface, when the selected one or more of the identified role(s) violates the at least one access rule, the notification indicating the violation and the at least one access rule, thereby permitting the user to select one or more different role from the identified role(s);
   generating, by the computing device, an access request for the user when the selected one or more of the identified role(s) does not violate the at least one access rule; and
   transmitting, by the computing device, the access request to an access management platform, thereby permitting the access management platform to process approval of the access request.

11. The computer-implemented method of claim 10, further comprising receiving, by the computing device, from the user through the request interface, an identification of the user; and wherein applying the at least one access rule to the selected one or more of the identified role(s) includes applying the at least one access rule to the selected one or more of the identified role(s) based on the identification of the user.

12. The computer-implemented method of claim 11, further comprising applying at least one other rule to each identified role prior to displaying the identified role and/or causing the identified role to be displayed; and when the at least one other rule is restrictive of the identified role, displaying the identified role and/or causing the identified role to be displayed to the user at the communication device in a different color than at least one other identified role.

13. A non-transitory computer-readable storage media including executable instructions for managing requests for access to one or more systems, which, when executed by at least one processor, cause the at least one processor to:

cause a request interface to be displayed at a communication device associated with a user requesting access to a system;

receive, through the request interface, from a user, an identifier of the user and a keyword associated with at least one aspect of the system and one or more of multiple roles of users in the system;

identify each role from the multiple roles consistent with the keyword;

cause each identified role to be displayed at the communication device in the request interface, thereby permitting the user to select from the identified role(s);

upon selection of one or more of the identified role(s), apply at least one access rule to the identifier of the user and the selected one or more of the identified role(s); and issue a notification to the user, at the request interface, when the selected one or more of the identified role(s) violates the at least one access rule, the notification indicating the violation and the at least one access rule, thereby permitting the user to select one or more different role from the identified role(s).

14. The non-transitory computer-readable storage media of claim 13, wherein the executable instructions, when executed by the at least one processor, further cause the at least one processor to:

generate an access request for the user when the selected one or more of the identified role(s) does not violate the at least one access rule; and transmit the access request to an access management platform, thereby permitting the access management platform to process approval of the access request.

15. The non-transitory computer-readable storage media of claim 13, wherein the executable instructions, when executed by the at least one processor, further cause the at least one processor to:

apply at least one other rule to each identified role prior to causing the identified role to be displayed; and when the at least one other rule is restrictive of the identified role, cause the identified role to be displayed to the user with a color difference applied to said identified role.

16. The non-transitory computer-readable storage media of claim 13, wherein the at least one aspect of the system includes multiple databases; and wherein the at least one access rule restricts access by the user to one of the multiple databases, when the user has access to another one of the multiple databases.

* * * * *